US009591489B2

United States Patent
Boss et al.

(10) Patent No.: US 9,591,489 B2
(45) Date of Patent: Mar. 7, 2017

(54) CONTROLLING APPLICATION ACCESS TO APPLICATIONS AND RESOURCES VIA GRAPHICAL REPRESENTATION AND MANIPULATION

(71) Applicant: International Business Machines Corporation, Armonk, NY (US)

(72) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 14/795,073

(22) Filed: Jul. 9, 2015

(65) Prior Publication Data

US 2017/0013460 A1    Jan. 12, 2017

(51) Int. Cl.
*H04L 29/06* (2006.01)
*H04W 12/08* (2009.01)
(Continued)

(52) U.S. Cl.
CPC .......... *H04W 12/08* (2013.01); *G06F 3/0484* (2013.01); *G06F 3/04817* (2013.01)

(58) Field of Classification Search
CPC ... H04W 12/08; H04W 12/06; G06F 3/04817; G06F 3/0484
(Continued)

(56) References Cited

U.S. PATENT DOCUMENTS 5,911,143 A   6/1999   Deinhart et al.
5,926,834 A   7/1999   Carlson et al.
(Continued)

FOREIGN PATENT DOCUMENTS

CN   WO 2014205756 A1 * 12/2014 ............. G06T 11/60

OTHER PUBLICATIONS

Yajin Zhou, Xinwen Zhang, Xuxian Jiang, and Vincent W. Freeh, Taming information-stealing smartphone applications (on Android), TRUST'11 Proceedings of the 4th international conference on Trust and trustworthy computing, pp. 93-107, Jun. 22, 2011.
(Continued)

*Primary Examiner* — Yogesh Paliwal
(74) *Attorney, Agent, or Firm* — Schmeiser, Olsen & Watts;; John R. Pivnichny

(57) ABSTRACT

An approach is provided for controlling a first application's access of a second application of a mobile device. Attributes are assigned to a graphical element displayed by the mobile device. Manipulations of first and second icons representing first and second applications, respectively, are detected as placing the first and second icons into the graphical element. One of the assigned attributes specifying an exchange of information permitted between the first and second applications is obtained. If access control settings of the first application are automatically configurable, the access control settings are automatically configured based on the obtained attribute; otherwise, the obtained attribute is applied to the first application by utilizing resource controls of the mobile device operating system. Based on the configured access control settings or the attribute applied to the first application, an access of the second application by the first application is controlled.

20 Claims, 6 Drawing Sheets

(51) Int. Cl.
*G06F 3/0481* (2013.01)
*G06F 3/0484* (2013.01)

(58) Field of Classification Search
USPC .......................................................... 726/27
See application file for complete search history.

(56) References Cited

U.S. PATENT DOCUMENTS

| | | |
|---|---|---|
| 5,987,506 A | 11/1999 | Carter et al. |
| 6,119,151 A | 9/2000 | Cantrell et al. |
| 6,195,650 B1 | 2/2001 | Gaither et al. |
| 6,356,863 B1 | 3/2002 | Sayle |
| 6,564,212 B2 | 5/2003 | Koskas |
| 6,574,502 B2 | 6/2003 | Hayashi |
| 6,574,618 B2 | 6/2003 | Eylon et al. |
| 6,748,502 B2 | 6/2004 | Watanabe et al. |
| 7,127,467 B2 | 10/2006 | Yalamanchi et al. |
| 7,139,811 B2 | 11/2006 | Lev Ran et al. |
| 7,185,192 B1 | 2/2007 | Kahn |
| 7,350,204 B2 | 3/2008 | Lambert et al. |
| 7,536,396 B2 | 5/2009 | Johnson et al. |
| 7,613,726 B1 | 11/2009 | Spivak et al. |
| 7,681,131 B1 | 3/2010 | Quarterman et al. |
| 7,774,827 B2 | 8/2010 | Kinser et al. |
| 8,336,078 B2 | 12/2012 | Dixit et al. |
| 8,756,509 B2 | 6/2014 | Boss et al. |
| 8,763,080 B2 | 6/2014 | Carrara et al. |
| 8,943,413 B2 | 1/2015 | Boss et al. |
| 9,137,253 B2 | 9/2015 | Boss et al. |
| 9,231,958 B2 | 1/2016 | Boss et al. |
| 2003/0200466 A1 | 10/2003 | Nelson et al. |
| 2004/0210604 A1 | 10/2004 | Li et al. |
| 2004/0239700 A1 | 12/2004 | Baschy |
| 2005/0149726 A1 | 7/2005 | Joshi et al. |
| 2006/0253771 A1 | 11/2006 | Baschy |
| 2006/0259955 A1 | 11/2006 | Gunther et al. |
| 2007/0073699 A1 | 3/2007 | Reed |
| 2007/0079358 A1 | 4/2007 | Lambert et al. |
| 2007/0150934 A1 | 6/2007 | Fiszman et al. |
| 2008/0313556 A1 | 12/2008 | Zhang et al. |
| 2009/0150981 A1 | 6/2009 | Amies et al. |
| 2009/0327900 A1 | 12/2009 | Noll et al. |
| 2011/0040793 A1 | 2/2011 | Davidson et al. |
| 2013/0031480 A1* | 1/2013 | Boss ..................... G06F 21/604 715/738 |
| 2013/0067413 A1 | 3/2013 | Boss et al. |
| 2013/0117840 A1 | 5/2013 | Roesner et al. |
| 2014/0018048 A1 | 1/2014 | Anand et al. |
| 2014/0115693 A1 | 4/2014 | Schieman et al. |
| 2014/0245429 A1 | 8/2014 | Boss et al. |
| 2015/0163227 A1 | 6/2015 | Boss et al. |

OTHER PUBLICATIONS

Jon Howell and Stuart Schechter, What You See is What they Get: Protecting users from unwanted use of microphones, camera, and other sensors, in Proceedings of Web 2.0 Security and Privacy Workshop, May 20, 2010, 9 pages.

Syta, James M.; List of IBM Patents or Patent Applications Treated as Related; Jul. 8, 2015; 1 page.

* cited by examiner

CONTROLLING APPLICATION ACCESS TO APPLICATIONS AND RESOURCES VIA GRAPHICAL REPRESENTATION AND MANIPULATION

TECHNICAL FIELD

The present invention relates to managing access to computer resources, and more particularly to controlling application-to-application or resource-to-resource relationships which provide data and resource sharing on a computing device.

BACKGROUND

Non-technical users of mobile devices and other computing devices with highly graphical interaction do not know or do not understand how to control how applications interact with other applications or resources. An app (i.e., application) being installed on a mobile device or other computing device may ask the user for permission to access another app or resource at the time of the first launch of the app. Unless the user knows how to change the access permissions using current techniques based on lists of access rights or text rules indicating all of the access rights of the app, the app will maintain its access to the other app or resource subsequent to the first launch of the app. The non-technical user often finds the current list or text rule-based access permission management techniques to be confusing.

Further, the user often installs an app, grants permissions at the time of installation, where the permissions are nested or buried under several setting options, uses the app only once, and then forgets about the app until space is needed to install another app. In the meantime, while the app remains installed but unused, the app may have been granted permission to (1) utilize cellular data, which is expensive for the user, (2) heavily use the central processing unit of the device, thereby significantly reducing battery life, or (3) access data from other apps, where the user wants that data to be unavailable to the app.

Still further, the user of the mobile device is typically concerned about a small subset of all of the access rights of an app installed on the device. For example, a user may be concerned about the battery life of the device and therefore has concern about whether an app has access to the Global Positioning System (GPS) chip, which causes a drain on the battery; whereas the same user may not be concerned about the app accessing other hardware (e.g., the Secure Digital (SD) card) of the device. As another example, a user may value privacy and thus be concerned about what type of information the device sends out to social networks. Accordingly, there is a need to provide an access control representation that is easily understood by the non-technical user.

BRIEF SUMMARY

In a first embodiment, the present invention provides a method of controlling an access, by a first application installed on a computer, of a second application installed on the computer. The method includes the computer assigning attributes to a graphical element included in a graphical user interface (GUI) of the computer. The method further includes the computer detecting a manipulation on the GUI of a first icon representing the first application so that the first icon is moved towards and subsequently placed into the graphical element included in the GUI. The method further includes the computer detecting a manipulation on the GUI of a second icon representing a second application so that the second icon is moved towards and subsequently placed into the graphical element. The method further includes based on the first and second icons representing the first and second applications, respectively, having been placed into the graphical element, the computer obtaining one of the assigned attributes, which specifies an interaction between the first and second applications. The interaction specifies information that is permitted to be exchanged between the first and second applications based on the first and second icons having been both placed in the graphical element. The method further includes the computer determining whether access control settings of the first application are automatically configurable. The method further includes (1) if the access control settings of the first application are automatically configurable, the computer automatically configuring the access control settings based on the obtained attribute specifying the interaction between the first and second applications or (2) if the access control settings of the first application are not automatically configurable, the computer applying the obtained attribute to the first application by utilizing resource controls of an operating system of the computer. The method further includes based on the computer automatically configuring the access control settings or the computer applying the obtained attribute to the first application by utilizing the resource controls of the operating system, the computer controlling the access of the second application by the first application.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of controlling an access, by a first application installed on a computer system, of a second application installed on the computer system. The method includes the computer system assigning attributes to a graphical element included in a graphical user interface (GUI) of the computer system. The method further includes the computer system detecting a manipulation on the GUI of a first icon representing the first application so that the first icon is moved towards and subsequently placed into the graphical element included in the GUI. The method further includes the computer system detecting a manipulation on the GUI of a second icon representing a second application so that the second icon is moved towards and subsequently placed into the graphical element. The method further includes based on the first and second icons representing the first and second applications, respectively, having been placed into the graphical element, the computer system obtaining one of the assigned attributes, which specifies an interaction between the first and second applications. The interaction specifies information that is permitted to be exchanged between the first and second applications based on the first and second icons having been both placed in the graphical element. The method further includes the computer system determining whether access control settings of the first application are automatically configurable. The method further includes (1) if the access control settings of the first application are automatically configurable, the computer system automatically configuring the access control settings based on the obtained attribute specifying the interaction between the first and second applications or (2) if the access control settings of the first application are not automatically configurable, the computer system applying the obtained attribute to the first application by utilizing resource controls of an operating system of the computer system. The method further includes based on the computer system automatically configuring the access control settings or the computer system applying the obtained attribute to the first application by utilizing the resource controls of the operating system, the computer system controlling the access of the second application by the first application.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of controlling an access, by a first application installed on the computer system, of a second application installed on the computer system. The method includes the computer system assigning attributes to a graphical element included in a graphical user interface (GUI) of the computer system. The method further includes the computer system detecting a manipulation on the GUI of a first icon representing the first application so that the first icon is moved towards and subsequently placed into the graphical element included in the GUI. The method further includes the computer system detecting a manipulation on the GUI of a second icon representing a second application so that the second icon is moved towards and subsequently placed into the graphical element. The method further includes based on the first and second icons representing the first and second applications, respectively, having been placed into the graphical element, the computer system obtaining one of the assigned attributes, which specifies an interaction between the first and second applications. The interaction specifies information that is permitted to be exchanged between the first and second applications based on the first and second icons having been both placed in the graphical element. The method further includes the computer system determining whether access control settings of the first application are automatically configurable. The method further includes (1) if the access control settings of the first application are automatically configurable, the computer system automatically configuring the access control settings based on the obtained attribute specifying the interaction between the first and second applications or (2) if the access control settings of the first application are not automatically configurable, the computer system applying the obtained attribute to the first application by utilizing resource controls of an operating system of the computer system. The method further includes based on the computer system automatically configuring the access control settings or the computer system applying the obtained attribute to the first application by utilizing the resource controls of the operating system, the computer system controlling the access of the second application by the first application.

Embodiments of the present invention simplify the control of application-to-application, application-to-application data, and application-to-resource interactions in a mobile device or other computing device by using the advanced graphical user interface (GUI) of the device to visually illustrate relationships between (1) applications, (2) applications and application data, and (3) applications and resources, and allow direct graphical manipulation by GUI methods to permit or restrict interaction or access in the aforementioned relationships. The visual illustration and direct graphical manipulation by the GUI provides an approach that is more intuitive, less error prone, and easier to use than known list and text rule-based access permission management techniques.

DETAILED DESCRIPTION

Overview

Embodiments of the present invention provide a GUI on a touch screen mobile device or other computing device that (1) visually illustrate relationships between applications and/or between applications and resources, where the resources include application data and hardware installed in the device, and (2) allow direct manipulation by graphic methods to permit or restrict an application's ability to interact with the device's hardware, other applications installed on the device, and data managed by other applications installed on the device. In one embodiment, the aforementioned graphic methods to permit or restrict an application's interaction with device's hardware, other applications, and application data include dragging and dropping an icon representing the application into a folder or other graphical element, or a defined region on the GUI of the device. In one embodiment, the folder, other graphical element, or defined region specify (i) how applications in the folder, other graphical element, or defined region interact with other applications in the same folder, other graphical element, or defined region (i.e., specifying application-to-application relationships by inclusion om the folder, other graphical element, defined region); (ii) how hardware of the device or other applications that are not included in the folder, other graphical element, or defined region interact with applications in the folder, other graphical element, or defined region (i.e., specifying application-to-application or application-to-resource relationships by exclusion from the folder, other graphical element, or defined region); or (iii) device resource behaviors, environmental behaviors, and/or technical functions to which applications included in the folder, other graphical element, or defined region must conform. An application icon may be placed into a single folder or into multiple folders. Alternatively, a single graphical element such as a single folder, or a single defined region may be assigned attributes to specify a combination of (i), (ii), and (iii) listed above.

Figure 1:
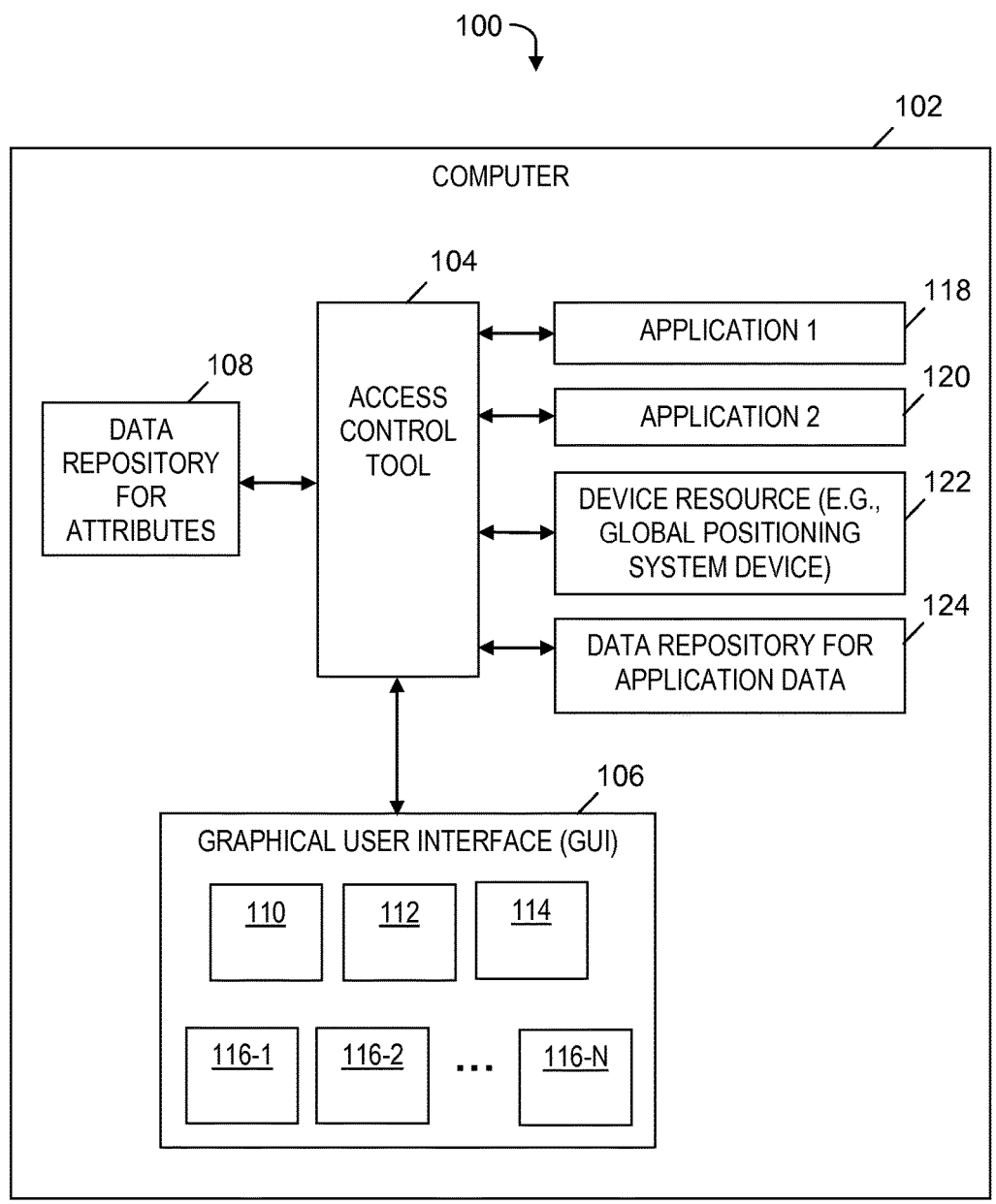
FIG. 1 is a block diagram of a system for controlling an access by a first application of a second application via graphical representation and manipulation, in accordance with embodiments of the present invention.

System for Controlling an Access by an Application to Another Application or Resource Via Graphical Representation and Manipulation FIG. 1 is a block diagram of a system 100 for controlling an access by a first application of a second application via graphical representation and manipulation, in accordance with embodiments of the present invention. System 100 includes a computer 102 which includes a software-based access control tool 104 and a graphical user interface (GUI) 106, which is presented on a display (not shown) included in or coupled to computer 102. In embodiments of the present invention, computer 102 is a mobile device (e.g., a smartphone), a tablet computer, or another computing device that includes robust human interface graphic functionality. System 100 includes a data repository 108 that includes attributes which are assigned to folders 110, 112, and 114, which are visual representations of file system components and which are included in GUI 106. The attributes are stored in and retrieved from data repository 108 by access control tool 104. Access control tool 104 assigns the attributes to folders 110, 112, and 114.

Attributes assigned to folder 110 specify how any application whose graphical representation is included in folder 110 is permitted to interact or restricted from interacting with any other application whose graphical representation is placed in folder 110. Attributes assigned to folder 112 specify how any application whose graphical representation is placed in folder 112 is permitted to interact or restricted from interacting with other applications or device resources whose graphical representations are not included in folder 112. Attributes assigned to folder 114 specify how any application whose graphical representation is placed in folder 114 is permitted to interact or restricted from interacting with device resource(s) or technical function(s) of computer 102, or is required to conform to environmental behavior(s) of computer 102.

In other embodiments, folders 110, 112, and 114 are replaced by other graphical elements rendered in GUI 106, or by respective regions or pages displayed in GUI 106.

GUI 106 also includes graphical representations (i.e., icons) 116-1, 116-2, . . . , 116-N of N applications (also known as apps), where N is an integer greater than one. Computer 102 includes a first software-based application 118 graphically represented by icon 116-1 on GUI 106 and a second software-based application 120 graphically represented by icon 116-2 on GUI 106. Computer 102 also includes a device resource 122 (i.e., a hardware-based device or system installed on the computer, such as a GPS device installed on a mobile device), and a data repository 124 that includes application data (i.e., data managed by applications 118 and 120). Device resource 122 is one of the resources whose interaction with application 118 may be specified based on graphical representation 116-1 of application 118 being place in folder 112 and a graphical representation (not shown) of device resource 122 not being placed in folder 112. Device resource 122 may include, for example, one of the following components of computer 102: a battery, GPS receiver, security chip, SD card, or a hardware component providing radio wave-based communications (e.g., a Near Field Communication (NFC) component) or access to a 4G Long Term Evolution (LTE) network.

Access control tool 104 detects a user utilizing graphic manipulation of one or more icons of applications (e.g., icon 116-1 and icon 116-2) to move the icon(s) towards and subsequently placing the icon(s) in one or more of folders 110, 112, and 114. Access control tool 104 obtains attributes assigned to folders 110, 112, and 114, assigns the attributes to application 118 based on which of the folders includes icon 116-1, and assigns the attributes to application 120 based on which of the folders includes icon 116-2. For any attribute that is not applied to an application, access control tool 104 generates and displays to a user of computer 102 a notification about the attribute(s) that were not applied.

In embodiments of the present invention, access control tool 104 may be included in hardware or software security products and in other products such as identity management systems that provide resource access control.

The functionality of the components shown in FIG. 1 is described in more detail in the discussion of FIG. 2, FIG. 3, and FIGS. 4A-4B presented below.

Figure 2:
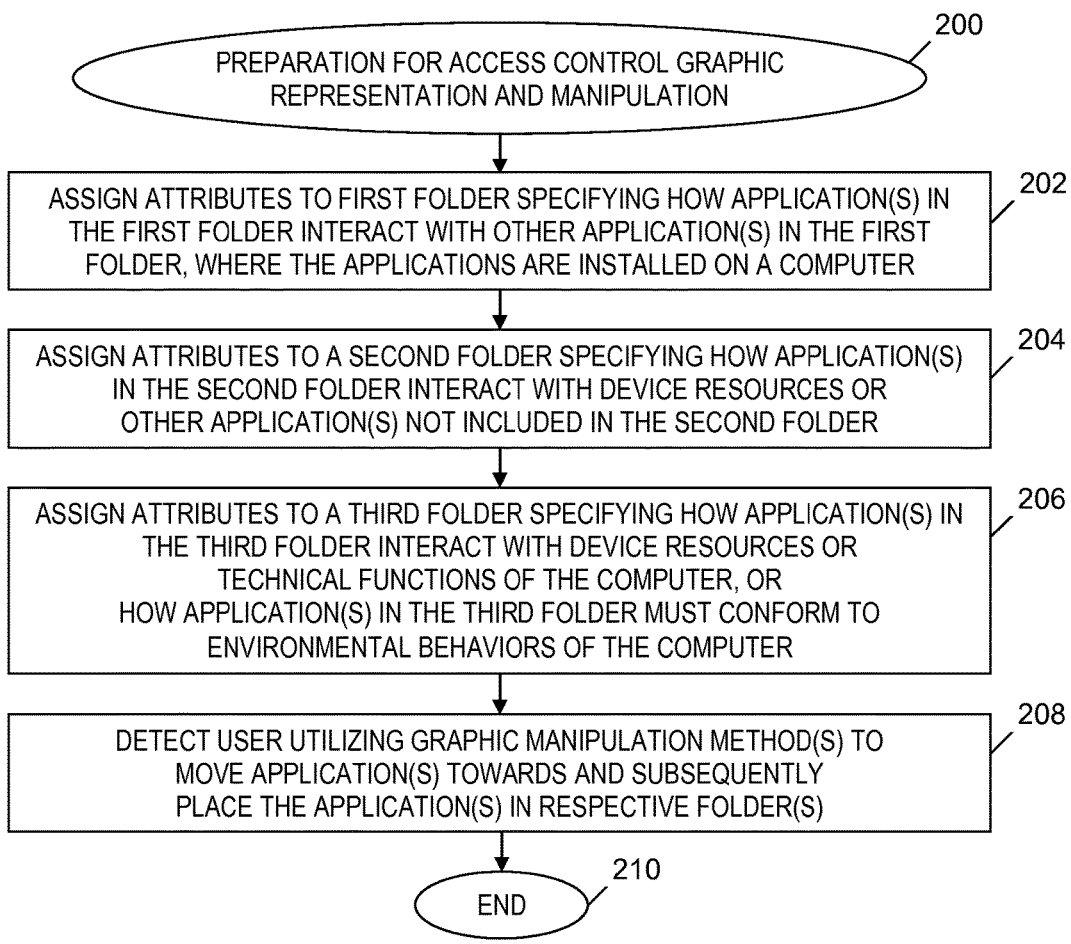
FIG. 2 is a flowchart of a process of performing a preparation for access control by graphic representation and manipulation, where the process is implemented in the system of FIG. 1, in accordance with embodiments of the present invention.

Process for Controlling an Access by an Application to Another Application or Resource Via Graphical Representation and Manipulation FIG. 2 is a flowchart of a process of performing a preparation for access control by graphic representation and manipulation, where the process is implemented in the system of FIG. 1, in accordance with embodiments of the present invention. The process of FIG. 2 starts at step 200. Prior to step 202, computer 102 receives attributes from user(s) or another system, where the attributes specify interactions between applications, interactions between applications and hardware-based resource(s) or technical function(s) of computer 102 (see FIG. 1), and required conformance of applications with environmental behaviors of computer 102 (see FIG. 1).

In step 202, access control tool 104 (see FIG. 1) retrieves first attributes from data repository 108 (see FIG. 1) and assigns the retrieved first attributes to folder 110 (see FIG. 1). The first attributes specify permitted or restricted interactions between an application whose icon is moved and placed into folder 110 (see FIG. 1) and other application(s) whose icon(s) are moved and placed into folder 110 (see FIG. 1), where the applications are installed on computer 102 (see FIG. 1).

In one or more embodiments, icon 116-1 (see FIG. 1) representing application 118 (see FIG. 1) and icon 116-2 (see FIG. 1) representing application 120 (see FIG. 1) are placed into folder 110 (see FIG. 1) and the first attributes include, for example, a combination of:

- a type of information that is permitted to be exchanged between application 118 (see FIG. 1) and application 120 (see FIG. 1) (e.g., types of information such as phone numbers, mailing addresses, email addresses, GPS coordinates of computer 102 (see FIG. 1), biometrics, or measurements of physiological functioning);
- a quantity of information that is permitted to be exchanged between application 118 (see FIG. 1) and application 120 (see FIG. 1);
- a quality of information that is permitted to be exchanged between application 118 (see FIG. 1) and application 120 (see FIG. 1) (e.g., applications are permitted to exchange names, but not contact information);
- a type of command that application 118 (see FIG. 1) is permitted to utilize to command application 120 (see FIG. 1) to perform a task;
- application 118 (see FIG. 1) and application 120 (see FIG. 1) being certified applications is a prerequisite for allowing information to be exchanged between application 118 (see FIG. 1) and application 120 (see FIG. 1) (e.g., certified by a digital distribution platform included in a predefined list of digital distribution platforms that have a vetting process for applications distributed by the platforms) (i.e., applications 118 and 120 (see FIG. 1) are not permitted to be side loaded applications);

application 118 (see FIG. 1) and application 120 (see FIG. 1) being authenticated to a specific person is a prerequisite for allowing information to be exchanged between application 118 (see FIG. 1) and application 120 (see FIG. 1); and application 118 (see FIG. 1) and application 120 (see FIG. 1) being on an enterprise-approved list of applications is a prerequisite for allowing information to be exchanged between application 118 (see FIG. 1) and application 120 (see FIG. 1).

In other embodiments, the aforementioned first attributes may include one or more other attributes not listed above. In one embodiment, the first attributes include a combination of the attributes listed above.

In step 204, access control tool 104 (see FIG. 1) retrieves second attributes from data repository 108 (see FIG. 1) and assigns the retrieved second attributes to folder 112 (see FIG. 1). The second attributes specify permitted or restricted interactions between an application whose icon is moved and placed into folder 112 (see FIG. 1) and other application(s) or resource(s) whose icon(s) are not moved and placed into folder 112 (see FIG. 1).

In one or more embodiments, icon 116-1 (see FIG. 1) representing application 118 (see FIG. 1) is placed into folder 112 (see FIG. 1), icon 116-2 (see FIG. 1) representing application 120 (see FIG. 1) is not placed into folder 112 (see FIG. 1), and the second attributes include, for example, a combination of:

a type of information that is permitted to be exchanged between application 118 (see FIG. 1) and application 120 (see FIG. 1);

a quantity of information that is permitted to be exchanged between application 118 (see FIG. 1) and application 120 (see FIG. 1);

a quality of information that is permitted to be exchanged between application 118 (see FIG. 1) and application 120 (see FIG. 1) (e.g., applications are permitted to exchange names, but not contact information);

a type of command that application 118 (see FIG. 1) is permitted to utilize to command application 120 (see FIG. 1) to perform a task;

application 118 (see FIG. 1) and application 120 (see FIG. 1) being certified applications is a prerequisite for allowing information to be exchanged between application 118 (see FIG. 1) and application 120 (see FIG. 1);

application 118 (see FIG. 1) and application 120 (see FIG. 1) being authenticated to a specific person is a prerequisite for allowing information to be exchanged between application 118 (see FIG. 1) and application 120 (see FIG. 1); and application 118 (see FIG. 1) and application 120 (see FIG. 1) being on an enterprise-approved list of applications is a prerequisite for allowing information to be exchanged between application 118 (see FIG. 1) and application 120 (see FIG. 1).

In other embodiments, the aforementioned second attributes may include one or more other attributes not listed above. In one embodiment, the second attributes include a combination of the attributes listed above.

In one or more embodiments, icon 116-1 (see FIG. 1) representing application 118 (see FIG. 1) is placed into folder 112 (see FIG. 1), another icon (not shown in FIG. 1) representing device resource 122 (see FIG. 1) is not placed into folder 112 (see FIG. 1), and the second attributes include, for example, a combination of:

a type of information that is permitted to be exchanged between device resource 122 (see FIG. 1) and application 118 (see FIG. 1);

a quantity of information that is permitted to be exchanged between device resource 122 (see FIG. 1) and application 118 (see FIG. 1);

a quality of information that is permitted to be exchanged between device resource 122 (see FIG. 1) and application 118 (see FIG. 1);

a type of command that application 118 (see FIG. 1) is permitted to utilize to command device resource 122 (see FIG. 1) to perform a task;

application 118 (see FIG. 1) being a certified application is a prerequisite for allowing information to be exchanged between device resource 122 (see FIG. 1) and application 118 (see FIG. 1);

application 118 (see FIG. 1) being authenticated to a specific person is a prerequisite for allowing information to be exchanged between device resource 122 (see FIG. 1) and application 118 (see FIG. 1); and application 118 (see FIG. 1) being on an enterprise-approved list of applications is a prerequisite for allowing information to be exchanged between device resource 122 (see FIG. 1) and application 118 (see FIG. 1).

In other embodiments, the aforementioned second attributes may include one or more other attributes not listed above. In one embodiment, the second attributes include a combination of the attributes listed above.

In step 206, access control tool 104 (see FIG. 1) retrieves third attributes from data repository 108 (see FIG. 1) and assigns the third attributes to folder 114 (see FIG. 1). The third attributes specify behavior(s) or technical function(s) of hardware-based resource(s) of computer 102 (see FIG. 1) or environmental behavior(s) of computer 102 (see FIG. 1) to which an application must conform, where the icon of the application is moved and placed into folder 114 (see FIG. 1).

In one or more embodiments, icon 116-1 (see FIG. 1) representing application 118 (see FIG. 1) is placed into folder 112 (see FIG. 1) and the third attributes include, for example, a combination of:

First power consumption attribute: application 118 (see FIG. 1) is permitted to consume no more than a defined maximum amount of power of computer 102 (see FIG. 1);

Second power consumption attribute: application 118 (see FIG. 1) is permitted to consume specified amounts of battery units based on the amount of battery remaining in computer 102 (see FIG. 1) (e.g., if remaining battery >50%, then application 118 (see FIG. 1) is permitted to use up to 10 battery units; if remaining battery <20% and ≤10%, then application 118 (see FIG. 1) is permitted to use up to 1 battery unit; and if remaining battery <10%, then application 118 (see FIG. 1) is permitted to use 0 battery units);

Central processing unit (CPU) consumption attribute: application 118 (see FIG. 1) is permitted to consume no more than a defined maximum amount of CPU cycles per unit of time;

First bandwidth consumption attribute: application 118 (see FIG. 1) is permitted to consume no more than a specified amount of bandwidth;

Second bandwidth consumption attribute: application 118 (see FIG. 1) is permitted to sync to an external resource (i.e., a resource external to computer 102 (see FIG. 1)) once per predetermined time period (e.g., a news app is permitted to sync once every 6 hours); and Third bandwidth consumption attribute: application 118 (see FIG. 1) is permitted to sync to an external resource during a specified time period (e.g., a news app is permitted to sync only during 7:00 AM and 7:00 PM).

In other embodiments, the third attributes may include one or more other attributes not listed above. In one embodiment, the third attributes include a combination of the attributes listed above.

In step 208, access control tool 104 (see FIG. 1) detects a user of computer 102 (see FIG. 1) utilizing graphic manipulation method(s) to move icon(s) of application(s) towards and subsequently place the icon(s) of the application(s) into respective folder(s) included in the group consisting of folder 110 (see FIG. 1), folder 112 (see FIG. 1), and folder 114 (see FIG. 1). The process of FIG. 2 ends at step 210.

As one example, the user of computer 102 (see FIG. 1) is concerned about the battery life of computer 102 (see FIG. 1) and therefore assigns first attributes to folder 110 (see FIG. 1) where the first attributes specify that only those applications whose icons are moved and placed into folder 110 (see FIG. 1) are permitted to utilize the GPS chip which in this example is device resource 122 (see FIG. 1). The user sets up folder 110 (see FIG. 1) to control access to the GPS chip because usage of the GPS chip causes a significant decrease in battery life. In step 208, the user drags and drops only icon 116-1 (see FIG. 1) into folder 110 (see FIG. 1). Because icon 116-1 (see FIG. 1) represents application 118 (see FIG. 1) and icon 116-1 (see FIG. 1) is the only icon that has been dragged and dropped into folder 110 (see FIG. 1), only application 118 (see FIG. 1) is permitted to utilize the GPS chip in this example. Since icon 116-2 (see FIG. 1) representing application 120 (see FIG. 1) and all other icons representing other applications (not shown in FIG. 1) installed on computer 102 were not dragged and dropped into folder 110 (see FIG. 1), application 120 (see FIG. 1) and the other applications (not shown in FIG. 1) are prevented from using the GPS chip.

In one embodiment, one or more gestures recognized by GUI 106 (see FIG. 1) opens up one of the folders (e.g., folder 110 in FIG. 1), displays an area that indicates the access permissions or restrictions (i.e., rules) the folder is enforcing, and/or displays icons that have been dragged and dropped into the folder.

Figure 3:
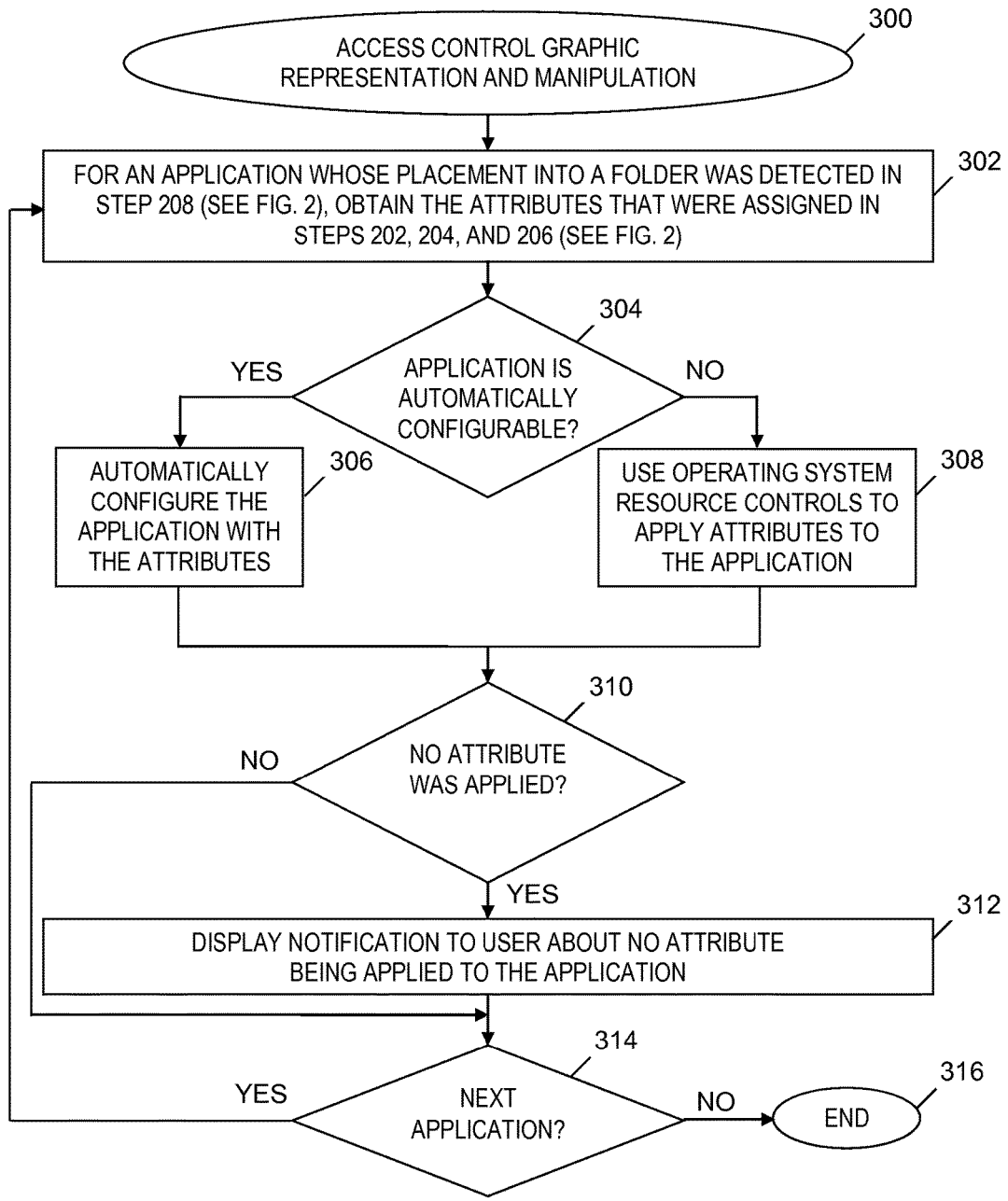
FIG. 3 is a flowchart of a process of controlling an access by a first application of a second application via graphical representation and manipulation, where the process is implemented in the system of FIG. 1, in accordance with embodiments of the present invention.

FIG. 3 is a flowchart of a process of controlling an access by a first application of a second application via graphical representation and manipulation, where the process is implemented in the system of FIG. 1, in accordance with embodiments of the present invention. The process of FIG. 3 begins at step 300. In step 302, for an application whose placement into folder 110 (see FIG. 1), folder 112 (see FIG. 1), or folder 114 (see FIG. 1) was detected in step 208 (see FIG. 2), access control tool 104 (see FIG. 1) obtains the attributes that were assigned in step 202 (see FIG. 2), step 204 (see FIG. 2), or step 206 (see FIG. 2). Hereinafter, in the discussion of FIG. 3, "the application" refers to the application most recently processed by step 302.

In step 304, access control tool 104 (see FIG. 1) determines if the application is automatically configurable. If access control tool 104 (see FIG. 1) in step 304 determines that the application is automatically configurable, then the Yes branch of step 304 is taken and step 306 is performed.

In one embodiment, access control tool 104 (see FIG. 1) determines the application is automatically configurable by determining that the application provides an application programming interface (API) that allows an external entity to make changes to access control settings of the application.

In step 306, access control tool 104 (see FIG. 1) automatically configures the application with the attributes obtained in step 302 for the application.

Returning to step 304, if access control tool 104 (see FIG. 1) determines that the application is not automatically configurable, then the No branch of step 304 is taken and step 308 is performed.

In step 308, access control tool 104 (see FIG. 1) attempts to utilize resource controls of the operating system (OS) of computer 102 (see FIG. 1) to apply the attributes obtained in step 302 to the application.

Step 310 follows step 306 and step 308. In step 310, access control tool 104 (see FIG. 1) determines whether attempts to apply attributes to the application in step 306 or step 308 results in no attribute being applied to the application. If access control tool 104 (see FIG. 1) in step 310 determines that no attribute was applied to the application, then the Yes branch of step 310 is taken and step 312 is performed.

In step 312, access control tool 104 (see FIG. 1) generates and displays a notification or a graphical element to the user of computer 102 (see FIG. 1), where the notification or graphical element indicates that no attributes were applied to the application and access control policies were not fully applied. After step 312, the user may manually apply the access control policies that were not fully applied to the application in step 306 or step 308, and subsequently, access control tool 104 (see FIG. 1) determines that that access control policies have been manually applied. In response to the determination that the policies have been manually applied, access control tool 104 (see FIG. 1) stops displaying the aforementioned notification or graphical element that had been displayed in step 312.

Returning to step 310, if access control tool 104 (see FIG. 1) determines that at least one attribute was applied to the application in step 306 or step 308, then the No branch of step 310 is taken and step 314 is performed.

In step 314, which follows step 312 and the No branch of step 310, access control tool 104 (see FIG. 1) determines whether there is a next application in application(s) whose placement(s) into respective folder(s) were detected in step 208 (see FIG. 2), and which has not yet been processed in step 302. If access control tool 104 (see FIG. 1) determines in step 314 that there is a next application, then the Yes branch of step 314 is taken and the process loops back to step 302, which processes the next application. If access control tool 104 (see FIG. 1) determines in step 314 that there is no other application whose placement into a corresponding folder was detected in step 208 (see FIG. 2) and which has not yet been processed in step 302, then the No branch of step 314 is taken and the process of Figure ends at step 316.

In an alternate embodiment, instead of determining in step 304 that the application is not automatically configurable before attempting to utilize resource controls of the OS of computer 102 (see FIG. 1) in step 308, step 304 is replaced with access control tool 104 (see FIG. 1) determining whether resource controls of the OS of computer 102 (see FIG. 1) can be used to apply the attributes to the application. If resource controls of the OS can be used to apply the attributes, then access control tool 104 (see FIG. 1) utilizes the resource controls to apply the attributes to the application; otherwise, access control tool 104 (see FIG. 1) initiates automatically configuring the application with the attributes.

Figure 4A:
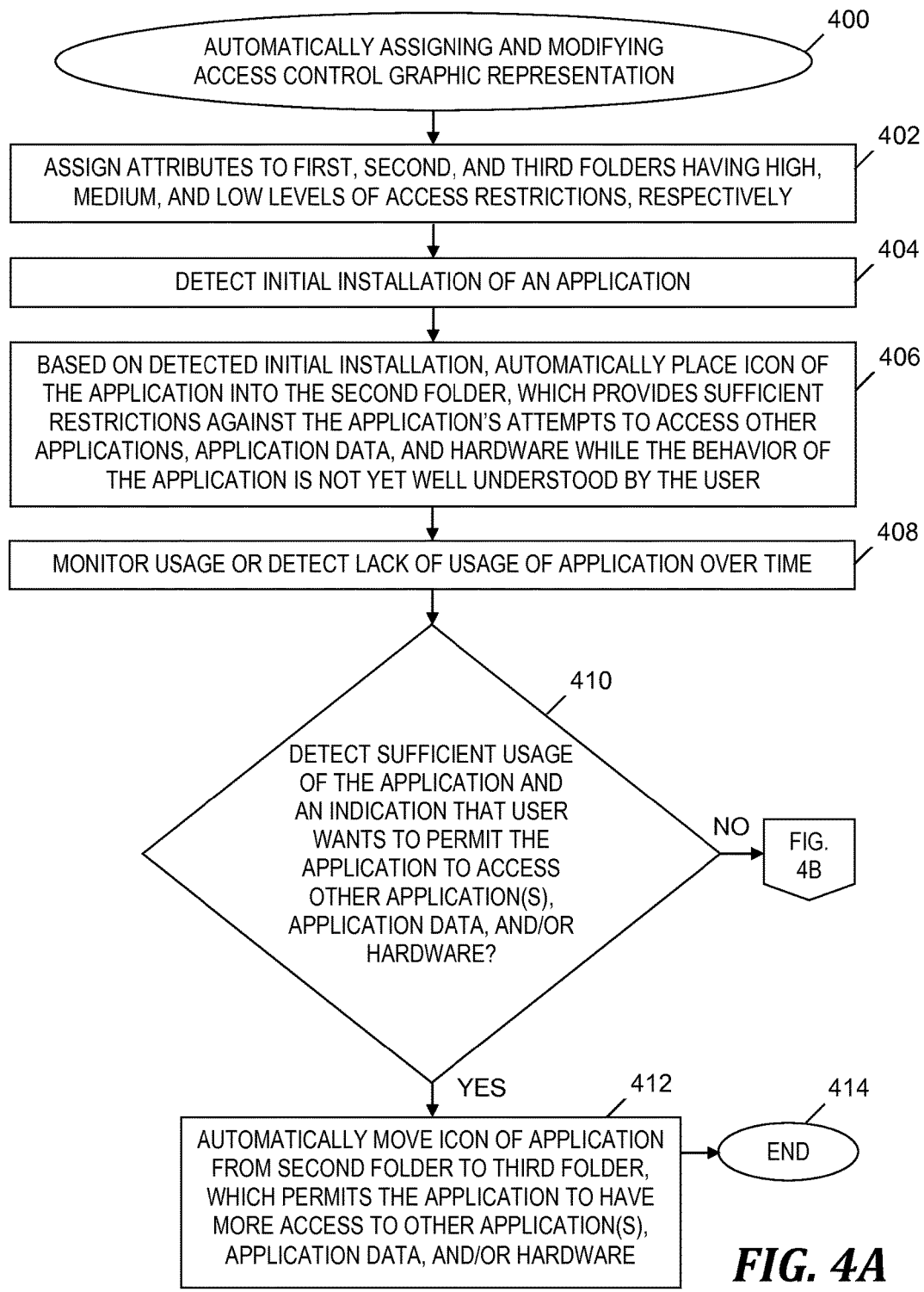
FIGS. 4A-4B depict a flowchart of automatically assigning and modifying access control graphic representation, where the process is implemented in the system of FIG. 1, in accordance with embodiments of the present invention.
Figure 4B:
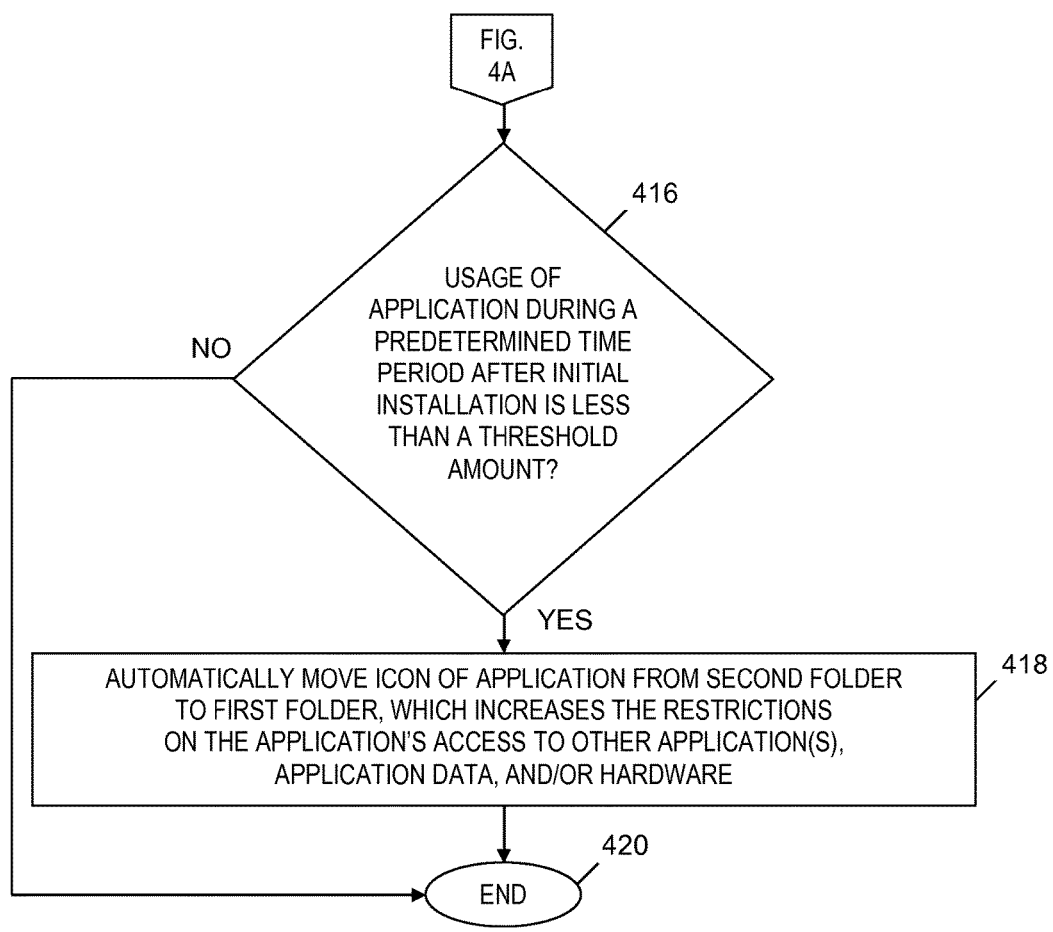

FIGS. 4A-4B depict a flowchart of automatically assigning and modifying access control graphic representation, where the process is implemented in the system of FIG. 1, in accordance with embodiments of the present invention. The process of FIGS. 4A-4B begins at step 400 in FIG. 4A. In step 402, access control tool 104 (see FIG. 1) assigns attributes to first, second, and third folders (not shown in FIG. 1) having high, medium, and low levels of access restrictions, respectively.

In step 404, access control tool 104 (see FIG. 1) detects an initial installation of application 118 (see FIG. 1) onto computer 102 (see FIG. 1).

In step 406, based on the initial installation being detected in step 404, access control tool 104 (see FIG. 1) automatically places icon 116-1 (see FIG. 1) of application 118 (see FIG. 1) into the second folder, which provides a predetermined sufficient amount of restrictions against attempts by application 118 (see FIG. 1) to access other applications, application data (i.e., data managed by the other applications), and hardware resources of computer 102 (see FIG. 1) while the behavior of the newly installed application 118 (see FIG. 1) is not yet well understood by the user of computer 102 (see FIG. 1).

In step 408, access control tool 104 (see FIG. 1) monitors usage of application 118 (see FIG. 1) or detects a lack of usage of application 118 (see FIG. 1), and determines an amount of usage of application 118 (see FIG. 1) over a predetermined amount of time.

In step 410, access control tool 104 (see FIG. 1) determines whether the amount of usage determined in step 408 is a sufficient amount (i.e., greater than a predetermined threshold amount) and whether the user of computer 102 (see FIG. 1) is indicating a want or need to permit application 118 (see FIG. 1) to access other application(s) installed on computer 102 (see FIG. 1), data managed by the other application(s), and/or hardware-based device resource(s) included in computer 102 (see FIG. 1).

If access control tool 104 (see FIG. 1) determines in step 410 that amount of usage is sufficient and the user indicates a want or need to permit application 118 (see FIG. 1) to access the other application(s), the application data, and/or hardware-based device resource(s) in computer 102 (see FIG. 1), then the Yes branch of step 410 is taken and step 412 is performed; otherwise, the No branch of step 410 is taken and the process continues in FIG. 4B.

In step 412, access control tool 104 (see FIG. 1) automatically moves an icon 116-1 (see FIG. 1) of application 118 (see FIG. 1) from the second folder to the third folder, which permits application 118 (see FIG. 1) to increase its access to the other application(s), the application data, and/or the hardware-based device resource(s). After step 412, the process of FIGS. 4A-4B ends at step 414.

Returning to the No branch of step 410, step 416 in FIG. 4B is performed after the No branch of step 410 is taken. In step 416, access control tool 104 (see FIG. 1) determines whether the usage of application 118 (see FIG. 1) during a predetermined amount of time after the initial installation of application 118 (see FIG. 1) is less than a predetermined threshold amount. If access control tool 104 (see FIG. 1) determines in step 416 that the usage of application 118 (see FIG. 1) during the predetermined amount of time after the initial installation is less than the threshold amount, then the Yes branch of step 416 is taken and step 418 is performed.

In step 418, access control tool 104 (see FIG. 1) automatically moves icon 116-1 (see FIG. 1) of application 118 (see FIG. 1) from the second folder to the first folder, which increases the restrictions on the access of application 118 (see FIG. 1) to the other application(s), the application data, and/or the hardware-based device resource(s) included in computer 102 (see FIG. 1). The movement of icon 116-1 (see FIG. 1) to the first folder (i.e., a more restrictive folder) prevents application 118 (see FIG. 1) from performing certain actions that have negative effects on the user, data, privacy, or computing resources such as the CPU of computer 102 (see FIG. 1), the batter of computer 102 (see FIG. 1), or data networks accessed by computer 102 (see FIG. 1). After step 418, the process of FIGS. 4A-4B ends at step 420.

Returning to step 416, if access control tool 104 (see FIG. 1) determines that the usage of application 118 (see FIG. 1) during the predetermined amount of time after the initial installation is not less than the threshold amount, then the No branch of step 416 is taken and the process of FIGS. 4A-4B ends at step 420.

Examples

In a first example, User C has a smartphone, which is computer 102 (see FIG. 1). User C has three apps installed on the smartphone which interact with people: a contacts app (i.e., User C's address book) and a SN1 app and a SN2 app, where SN1 and SN2 are two online social networking sites. User C wants to allow the SN1 and SN2 apps to interact with each other to share contact information, status updates, etc. Utilizing GUI 106 (see FIG. 1), User C drags and drops the icons 116-1 (see FIG. 1) and 116-2 (see FIG. 1) of the SN1 and SN2 apps, respectively, into folder 110 (see FIG. 1), where the icons being placed in folder 110 (see FIG. 1) allows the applications represented by the icons to interact and share data with each other. User C also wants the SN1 and SN2 apps to be allowed to use the cellular data of the smartphone to push or receive updates. In another folder (i.e., folder 112 (see FIG. 1)), User C drags and drops an icon of the contacts app (not shown). Folder 112 allows applications whose icons have been placed in folder 112 (see FIG. 1) to receive WiFi updates, but does not allow those applications to use cellular data, which keeps costs down for User C. User C then wants to install a new app, the SN3 app, where SN3 is a business-oriented social networking site. User C wants to allow the SN3 app to access the contacts app and the SN1 and SN2 apps, as well as allow the SN3 app to use cellular data. User C drags and drops the icon of the SN3 app into both folder 110 (see FIG. 1) and folder 112 (see FIG. 1), thereby creating a "shortcut" in both of the folders. The placement of the icon of the SN3 app in folders 110 and 112 (see FIG. 1) causes the SN3 app to inherit the permissions in all the folders in which its icon is placed. Therefore, the SN3 app is allowed access to the people stores in the three previously installed apps and is permitted to receive WiFi updates and to use cellular data.

Viewed from the technical side in an OS of a mobile device (e.g., an OS sold under the trademark ANDROID, which is a registered trademark owned by Google, Inc.), all communications to and from an application is performed via messages, which can be sent without specifying a target destination. For example, an application can send a message which indicates the current GPS coordinates, the contents of the address book, the prescriptions in the user's current prescription list, the history of when the user spoke on the phone and the phone numbers the user called, or the message can turn on the camera or turn off the light that indicates the camera is on, without specifying the component within the phone which will respond to the message. The OS then routes the message to a component which responds with the information or status or makes the changes in the phone. Thus, an app does not need to know what other apps or resources are in the system, and either an app designed with malicious intent from the beginning, an app that has been hacked and into which malware has been placed, or an app that will leak out information that the user does not want to be exposed can easily be installed onto a system without the user being aware of the interactions involving the app.

Known configuration screens, by which a user defines that an app does or does not have access to certain resources, apply to only those apps that have not been hacked or designed from the beginning to be malware, whereas other apps will ignore the user-supplied configuration or the subject communication will not have a corresponding configurable user control.

Thus, the user needs a very simple, straightforward way to represent in their mind, the information access or resource access restrictions. Icons placed in folders (e.g., icon 116-1 (see FIG. 1) being placed in folder 110 (see FIG. 1)) is an effective way for the user to understand and apply these restrictions.

In one example, the user has a game app (e.g., application 118 in FIG. 1) installed on the user's smartphone (e.g., computer 102 (see FIG. 1)). The game app has a hidden or hacked code to make a copy of all the phone numbers that the user calls and a copy of all the text messages, and to send this copied information to a malicious entity. The user places the icon 116-1 (see FIG. 1) of the game app into folder 110 (see FIG. 1) that represents no access to any smartphone-related data and no communication outside of the smartphone. By placing the game app into the folder, the game app could not be able to make a copy of the phone numbers called by the user and the user's text messages.

In another example, a WiFi location app (e.g., application 118 (see FIG. 1)) installed on computer 102 (see FIG. 1) is supposed to notify the user of WiFi hotspots, based on an inventory that can be accessed by the app. Unknown to the user, the app also starts up the smartphone's radio every five minutes and profiles any WiFi it can observe, including the user's home WiFi. The app then sends the profiled information to a central location, where the information is stored in a database. In addition to having the user's personal WiFi characterized and listed in an unauthorized database, the app runs down the battery of computer 102 (see FIG. 1) by turning on the radio every five minutes. The user prevents the profiling of the user's personal WiFi, the listing of the profiled information in the database, and the battery drain by placing the icon of the app in a folder (e.g., folder 110 in FIG. 1) that represents no access to the services of the computer 102 (see FIG. 1), including no access to the radio of the computer 102 (see FIG. 1).

Computer System

Figure 5:
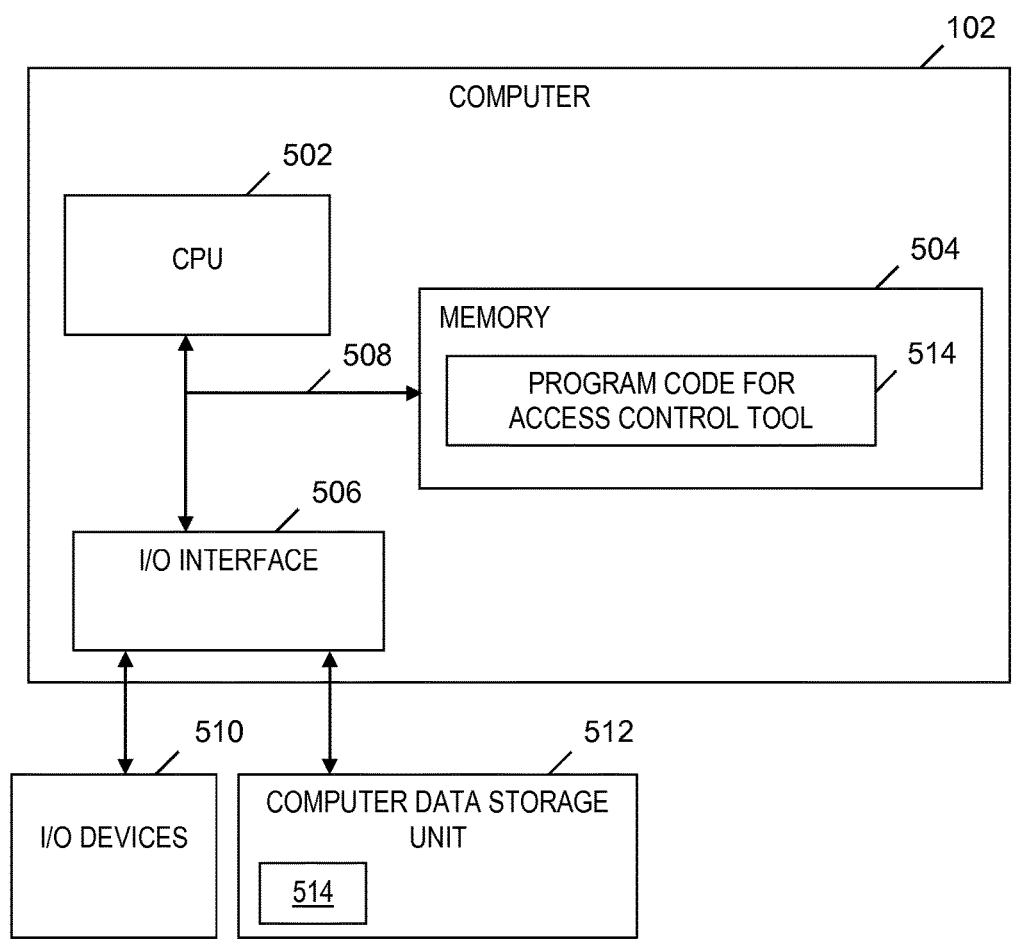
FIG. 5 is a block diagram of a computer included in the system of FIG. 1 and that implements the processes of FIG. 2, FIG. 3, and FIGS. 4A-4B, in accordance with embodiments of the present invention.

FIG. 5 is a block diagram of a computer 102 that is included in the system of FIG. 1 and implements the processes of FIG. 2, FIG. 3, and FIGS. 4A-4B, in accordance with embodiments of the present invention. Computer 102 is a computer system (e.g., a mobile device) that generally includes a central processing unit (CPU) 502, a memory 504, an input/output (I/O) interface 506, and a bus 508. Further, computer 102 is coupled to I/O devices 510 and a computer data storage unit 512. CPU 502 performs computation and control functions of computer 102, including executing instructions included in program code 514 for access control tool 104 (see FIG. 1) to perform a method of controlling application access of applications and resources via graphical representation and manipulation, where the instructions are executed by CPU 502 via memory 504. CPU 502 may include a single processing unit, or be distributed across one or more processing units in one or more locations (e.g., on a client and server).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are executed. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display device, keyboard, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). Computer data storage unit 512 includes a known computer-readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are executed by CPU 502 via memory 504 to control application access of applications and resources via graphical representation and manipulation. Although FIG. 5 depicts memory 504 as including program code 514, the present invention contemplates embodiments in which memory 504 does not include all of code 514 simultaneously, but instead at one time includes only a portion of code 514.

Further, memory 504 may include an operating system (not shown) and may include other systems not shown in FIG. 5.

Storage unit 512 and/or one or more other computer data storage units (not shown) that are coupled to computer 102 may include any combination of data repository for attributes 108 (see FIG. 1) and data repository for application data 124 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to controlling application access of applications and resources via graphical representation and manipulation. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 102) including one or more processors (e.g., CPU 502), wherein the processor(s) execute instructions contained in the code causing the computer system to control application access of applications and resources via graphical representation and manipulation. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of controlling application access of applications and resources via graphical representation and manipulation.

While it is understood that program code 514 for controlling application access of applications and resources via graphical representation and manipulation may be deployed by manually loading directly in client, server and proxy computers (not shown) via loading a computer-readable storage medium (e.g., computer data storage unit 512), program code 514 may also be automatically or semi-automatically deployed into computer 102 by sending program code 514 to a central server or a group of central servers. Program code 514 is then downloaded into client computers (e.g., computer 102) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of controlling application access of applications and resources via graphical representation and manipulation. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 102) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, and FIGS. 4A-4B) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of controlling an access, by a first application installed on a mobile device, of a second application installed on the mobile device, the method comprising the steps of:
   the mobile device assigning attributes to a graphical element included in a graphical user interface (GUI) of the mobile device, which is a computer;
   the mobile device detecting a manipulation on the GUI of a first icon representing the first application so that the first icon is moved towards and subsequently placed into the graphical element included in the GUI;
   the mobile device detecting a manipulation on the GUI of a second icon representing a second application so that the second icon is moved towards and subsequently placed into the graphical element;
   based on the first and second icons representing the first and second applications, respectively, having been placed into the graphical element, the mobile device obtaining one of the assigned attributes, which specifies an interaction between the first and second applications, the interaction specifying information that is permitted to be exchanged between the first and second applications based on the first and second icons having been both placed in the graphical element;
   the mobile device determining whether access control settings of the first application are automatically configurable;
   if the access control settings of the first application are automatically configurable, the mobile device automatically configuring the access control settings based on the obtained attribute specifying the interaction between the first and second applications or if the access control settings of the first application are not automatically configurable, the mobile device applying the obtained attribute to the first application by utilizing resource controls of an operating system of the mobile device; and
   based on the mobile device automatically configuring the access control settings or the mobile device applying the obtained attribute to the first application by utilizing the resource controls of the operating system, the mobile device controlling the access of the second application by the first application.

2. The method of claim 1, further comprising the steps of:
   the mobile device assigning second attributes to a second graphical element included in the GUI of the mobile device;
   the mobile device detecting a manipulation on the GUI of a third icon representing a third application installed on the mobile device so that the third icon is moved towards and subsequently placed into the second graphical element included in the GUI;
   the mobile device determining a fourth icon representing a fourth application installed on the mobile device has not been placed into the second graphical element by a manipulation of the fourth icon on the GUI;
   based on the third icon representing the third application having been placed into the second graphical element and the fourth icon not having been placed into the second graphical element, the mobile device obtaining one of the assigned second attributes, which specifies an interaction between the third and fourth applications, the interaction specifying information that is permitted to be exchanged between the third and fourth applications based on the third icon having been placed in the second graphical element and the fourth icon not having been placed in the second graphical element;

if the access control settings of the third application are automatically configurable, the mobile device automatically configuring the access control settings of the third application based on the obtained attribute from the second attributes specifying the interaction between the third and fourth applications or if the access control settings of the third application are not automatically configurable, the mobile device applying the obtained attribute from the second attributes to the third application by utilizing resource controls of the operating system of the mobile device; and based on the mobile device automatically configuring the access control settings of the third application or the mobile device applying the obtained attribute from the second attributes to the third application by utilizing the resource controls of the operating system, the mobile device controlling an access of the fourth application by the third application.

3. The method of claim 2, further comprising the steps of:

the mobile device assigning third attributes to a third graphical element included in the GUI of the mobile device;

the mobile device detecting a manipulation of on the GUI of a fifth icon representing a fifth application installed on the mobile device, so that the fifth icon is moved towards and subsequently placed into the third graphical element included in the GUI;

based on the fifth icon representing the fifth application having been placed into the third graphical element, the mobile device obtaining one of the assigned third attributes, which specifies a limitation of a consumption of a resource of the mobile device by the fifth application, the limitation being based on the fifth icon having been placed into the third graphical element, and the resource including a hardware device included in the mobile device, a virtual component of the mobile device, data managed by an application installed on the mobile device, or a physical or virtual component included in or data managed by a system external to the mobile device;

the mobile device determining whether access control settings of the fifth application are automatically configurable;

if the access control settings of the fifth application are automatically configurable, the mobile device automatically configuring the access control settings of the fifth application based on the obtained attribute from the third attributes or if the access control settings of the fifth application are not automatically configurable, the mobile device applying the obtained attribute from the third attributes to the fifth application by utilizing the resource controls of the operating system of the mobile device; and based on the mobile device automatically configuring the access control settings of the fifth application or the mobile device applying the obtained attribute from the third attributes to the fifth application by utilizing the resource controls of the operating system, the mobile device controlling an access of the resource by the fifth application.

4. The method of claim 3, wherein the step of assigning the attributes to the graphical element includes assigning the attributes to a first folder in the GUI of the mobile device, wherein the step of assigning the second attributes to the second graphical element included in the GUI includes assigning the second attributes to a second folder in the GUI, wherein the step of assigning the third attributes to the third graphical element included in the GUI includes assigning the third attributes to a third folder in the GUI, wherein the step of detecting the manipulation of the first icon includes detecting a first drag and drop of the first icon into the first folder, wherein the step of detecting the manipulation of the second icon includes detecting a second drag and drop of second icon into the first folder, wherein the step of detecting the manipulation of the third icon includes detecting a third drag and drop of the third icon into the second folder, wherein the step of determining the fourth icon has not been placed into the second graphical element includes determining that a drag and drop of the fourth icon into the second folder has not occurred, wherein the step of detecting the manipulation of the fifth icon includes detecting a fourth drag and drop of the fifth icon into the third folder, wherein the step of obtaining one of the assigned attributes is based on the first and second icons having been dragged and dropped into the first folder, wherein the step of obtaining one of the assigned second attributes is based on the third icon having been dragged and dropped into the second folder and the fourth icon not having been dragged and dropped into the second folder, and wherein the step of obtaining one of the assigned third attributes is based on the fifth icon having been dragged and dropped into the third folder.

5. The method of claim 3, wherein the step of controlling the access of the second application by the first application is based on the first and second icons having been dragged and dropped into the first folder, wherein the step of controlling the access of the fourth application by the third application is based on the third icon having been dragged and dropped into the second folder and the fourth icon not having been dragged and dropped into the second folder, wherein the step of controlling the access the access of the resource by the fifth application is based on the fifth icon having been dragged and dropped into the third folder.

6. The method of claim 1, further comprising the steps of:

the mobile device assigning first, second, and third attributes to first, second, and third folders, respectively, included in the GUI, the first attributes specifying first restrictions on an access by an application to other application(s), application data, or hardware of the mobile device if an icon of the application is in the first folder, the second attributes specifying second restrictions on the access by the application to the other application(s), application data, or hardware of the mobile device if the icon of the application is in the second folder, and the third attributes specifying third restrictions on the access by the application to the other application(s), application data, or hardware of the mobile device if the icon of the application is in the third folder, wherein the first restrictions are more restrictive than the second or third restrictions, and wherein the second restrictions are more restrictive than the third restrictions;

the mobile device detecting an initial installation of the application;

based on the detected initial installation, the mobile device placing the icon of the application into the second folder;

the mobile device monitoring a usage of the application over a predetermined period of time;

the mobile device determining whether the usage of the application during the predetermined period of time exceeds a first threshold and detecting whether a user of the mobile device is indicating that the application requires a decrease in restrictions on access to the other application(s), application data, or hardware of the mobile device;

if the usage exceeds the first threshold and the user indicates that the application requires the decrease in restrictions, the mobile device moves the icon of the application from the second folder to the third folder, which permits the application to have additional access to the other application(s), application data, or hardware of the mobile device, or if the usage does not exceed the first threshold or the user does not indicate that the application requires the decrease in restrictions, the mobile device determining whether the usage is less than a second threshold; and if the mobile device determines the usage is less than the second threshold, the mobile device moves the icon of the application from the second folder to the first folder, which restricts the application to have less access to the other application(s), application data, or hardware of the mobile device.

7. The method of claim 1, further comprising the steps of:

the mobile device detecting a manipulation on the GUI of a third icon representing a third application installed on the mobile device so that the third icon is moved towards and subsequently placed into the graphical element included in the GUI;

the mobile device detecting a manipulation on the GUI of a fourth icon representing a fourth application so that the fourth icon is moved towards and subsequently placed into the graphical element;

based on the third and fourth icons having been placed into the graphical element, the mobile device obtaining a second attribute included in the assigned attributes, which specifies an interaction between the third and fourth applications;

the mobile device initiating an attempt to apply the second attribute to the third application by automatically configuring access control settings of the third application or by utilizing the resource controls of the operating system of the mobile device;

the mobile device determining the attempt to apply the second attribute results in the second attribute not being applied to the third application;

in response to the step of determining the attempt to apply the second attribute results in the second attribute not being applied to the third application, the mobile device initiating a display of a notification to a user of the mobile device that the second attribute is not applied to the third application.

8. The method of claim 6, further comprising the steps of:

the mobile device determining the user utilized a manual technique to apply the second attribute to the third application in response to the step of initiating the display of the notification to the user; and in response to the step of determining the user utilized the manual technique to apply the second attribute to the third application, the mobile device ending the display of the notification to the user that the second attribute is not applied to the third application.

9. A computer program product, comprising:

a computer-readable storage medium; and a computer-readable program code stored in the computer-readable storage medium, the computer-readable program code containing instructions that are executed by a central processing unit (CPU) of a mobile device, which is a computer system, to implement a method of controlling an access, by a first application installed on a mobile device, of a second application installed on the mobile device, the method comprising the steps of:

the mobile device assigning attributes to a graphical element included in a graphical user interface (GUI) of the mobile device;

the mobile device detecting a manipulation on the GUI of a first icon representing the first application so that the first icon is moved towards and subsequently placed into the graphical element included in the GUI;

the mobile device detecting a manipulation on the GUI of a second icon representing a second application so that the second icon is moved towards and subsequently placed into the graphical element;

based on the first and second icons representing the first and second applications, respectively, having been placed into the graphical element, the mobile device obtaining one of the assigned attributes, which specifies an interaction between the first and second applications, the interaction specifying information that is permitted to be exchanged between the first and second applications based on the first and second icons having been both placed in the graphical element;

the mobile device determining whether access control settings of the first application are automatically configurable;

if the access control settings of the first application are automatically configurable, the mobile device automatically configuring the access control settings based on the obtained attribute specifying the interaction between the first and second applications or if the access control settings of the first application are not automatically configurable, the mobile device applying the obtained attribute to the first application by utilizing resource controls of an operating system of the mobile device; and based on the mobile device automatically configuring the access control settings or the mobile device applying the obtained attribute to the first application by utilizing the resource controls of the operating system, the mobile device controlling the access of the second application by the first application.

10. The program product of claim 9, wherein the method further comprises the steps of:

the mobile device assigning second attributes to a second graphical element included in the GUI of the mobile device;

the mobile device detecting a manipulation on the GUI of a third icon representing a third application installed on the mobile device so that the third icon is moved towards and subsequently placed into the second graphical element included in the GUI;

the mobile device determining a fourth icon representing a fourth application installed on the mobile device has not been placed into the second graphical element by a manipulation of the fourth icon on the GUI;

based on the third icon representing the third application having been placed into the second graphical element and the fourth icon not having been placed into the second graphical element, the mobile device obtaining one of the assigned second attributes, which specifies an interaction between the third and fourth applications, the interaction specifying information that is permitted to be exchanged between the third and fourth applications based on the third icon having been placed in the second graphical element and the fourth icon not having been placed in the second graphical element;

if the access control settings of the third application are automatically configurable, the mobile device automatically configuring the access control settings of the third application based on the obtained attribute from the second attributes specifying the interaction between the third and fourth applications or if the access control settings of the third application are not automatically configurable, the mobile device applying the obtained attribute from the second attributes to the third application by utilizing resource controls of the operating system of the mobile device; and based on the mobile device automatically configuring the access control settings of the third application or the mobile device applying the obtained attribute from the second attributes to the third application by utilizing the resource controls of the operating system, the mobile device controlling an access of the fourth application by the third application.

11. The program product of claim 10, wherein the method further comprises the steps of:

the mobile device assigning third attributes to a third graphical element included in the GUI of the mobile device;

the mobile device detecting a manipulation of on the GUI of a fifth icon representing a fifth application installed on the mobile device, so that the fifth icon is moved towards and subsequently placed into the third graphical element included in the GUI;

based on the fifth icon representing the fifth application having been placed into the third graphical element, the mobile device obtaining one of the assigned third attributes, which specifies a limitation of a consumption of a resource of the mobile device by the fifth application, the limitation being based on the fifth icon having been placed into the third graphical element, and the resource including a hardware device included in the mobile device, a virtual component of the mobile device, data managed by an application installed on the mobile device, or a physical or virtual component included in or data managed by a system external to the mobile device;

the mobile device determining whether access control settings of the fifth application are automatically configurable;

if the access control settings of the fifth application are automatically configurable, the mobile device automatically configuring the access control settings of the fifth application based on the obtained attribute from the third attributes or if the access control settings of the fifth application are not automatically configurable, the mobile device applying the obtained attribute from the third attributes to the fifth application by utilizing the resource controls of the operating system of the mobile device; and based on the mobile device automatically configuring the access control settings of the fifth application or the mobile device applying the obtained attribute from the third attributes to the fifth application by utilizing the resource controls of the operating system, the mobile device controlling an access of the resource by the fifth application.

12. The program product of claim 11, wherein the step of assigning the attributes to the graphical element includes assigning the attributes to a first folder in the GUI of the mobile device, wherein the step of assigning the second attributes to the second graphical element included in the GUI includes assigning the second attributes to a second folder in the GUI, wherein the step of assigning the third attributes to the third graphical element included in the GUI includes assigning the third attributes to a third folder in the GUI, wherein the step of detecting the manipulation of the first icon includes detecting a first drag and drop of the first icon into the first folder, wherein the step of detecting the manipulation of the second icon includes detecting a second drag and drop of second icon into the first folder, wherein the step of detecting the manipulation of the third icon includes detecting a third drag and drop of the third icon into the second folder, wherein the step of determining the fourth icon has not been placed into the second graphical element includes determining that a drag and drop of the fourth icon into the second folder has not occurred, wherein the step of detecting the manipulation of the fifth icon includes detecting a fourth drag and drop of the fifth icon into the third folder, wherein the step of obtaining one of the assigned attributes is based on the first and second icons having been dragged and dropped into the first folder, wherein the step of obtaining one of the assigned second attributes is based on the third icon having been dragged and dropped into the second folder and the fourth icon not having been dragged and dropped into the second folder, and wherein the step of obtaining one of the assigned third attributes is based on the fifth icon having been dragged and dropped into the third folder.

13. The program product of claim 11, wherein the step of controlling the access of the second application by the first application is based on the first and second icons having been dragged and dropped into the first folder, wherein the step of controlling the access of the fourth application by the third application is based on the third icon having been dragged and dropped into the second folder and the fourth icon not having been dragged and dropped into the second folder, wherein the step of controlling the access the access of the resource by the fifth application is based on the fifth icon having been dragged and dropped into the third folder.

14. The program product of claim 9, wherein the method further comprises the steps of:

the mobile device assigning first, second, and third attributes to first, second, and third folders, respectively, included in the GUI, the first attributes specifying first restrictions on an access by an application to other application(s), application data, or hardware of the mobile device if an icon of the application is in the first folder, the second attributes specifying second restrictions on the access by the application to the other application(s), application data, or hardware of the mobile device if the icon of the application is in the second folder, and the third attributes specifying third restrictions on the access by the application to the other application(s), application data, or hardware of the mobile device if the icon of the application is in the third folder, wherein the first restrictions are more restrictive than the second or third restrictions, and wherein the second restrictions are more restrictive than the third restrictions;

the mobile device detecting an initial installation of the application;

based on the detected initial installation, the mobile device placing the icon of the application into the second folder;

the mobile device monitoring a usage of the application over a predetermined period of time;

the mobile device determining whether the usage of the application during the predetermined period of time exceeds a first threshold and detecting whether a user of the mobile device is indicating that the application requires a decrease in restrictions on access to the other application(s), application data, or hardware of the mobile device;

if the usage exceeds the first threshold and the user indicates that the application requires the decrease in restrictions, the mobile device moves the icon of the application from the second folder to the third folder, which permits the application to have additional access to the other application(s), application data, or hardware of the mobile device, or if the usage does not exceed the first threshold or the user does not indicate that the application requires the decrease in restrictions, the mobile device determining whether the usage is less than a second threshold; and if the mobile device determines the usage is less than the second threshold, the mobile device moves the icon of the application from the second folder to the first folder, which restricts the application to have less access to the other application(s), application data, or hardware of the mobile device.

15. A mobile device which is a computer system comprising:
    a central processing unit (CPU);
    a memory coupled to the CPU; and
    a computer readable storage device coupled to the CPU, the storage device containing instructions that are executed by the CPU via the memory to implement a method of controlling an access, by a first application installed on the mobile device, of a second application installed on the mobile device, the method comprising the steps of:
        the mobile device assigning attributes to a graphical element included in a graphical user interface (GUI) of the mobile device;
        the mobile device detecting a manipulation on the GUI of a first icon representing the first application so that the first icon is moved towards and subsequently placed into the graphical element included in the GUI;
        the mobile device detecting a manipulation on the GUI of a second icon representing a second application so that the second icon is moved towards and subsequently placed into the graphical element;
        based on the first and second icons representing the first and second applications, respectively, having been placed into the graphical element, the mobile device obtaining one of the assigned attributes, which specifies an interaction between the first and second applications, the interaction specifying information that is permitted to be exchanged between the first and second applications based on the first and second icons having been both placed in the graphical element;
        the mobile device determining whether access control settings of the first application are automatically configurable;
        if the access control settings of the first application are automatically configurable, the mobile device automatically configuring the access control settings based on the obtained attribute specifying the interaction between the first and second applications or if the access control settings of the first application are not automatically configurable, the mobile device applying the obtained attribute to the first application by utilizing resource controls of an operating system of the mobile device; and
        based on the mobile device automatically configuring the access control settings or the mobile device applying the obtained attribute to the first application by utilizing the resource controls of the operating system, the mobile device controlling the access of the second application by the first application.

16. The mobile device of claim 15, wherein the method further comprises the steps of:
    the mobile device assigning second attributes to a second graphical element included in the GUI of the mobile device;
    the mobile device detecting a manipulation on the GUI of a third icon representing a third application installed on the mobile device so that the third icon is moved towards and subsequently placed into the second graphical element included in the GUI;
    the mobile device determining a fourth icon representing a fourth application installed on the mobile device has not been placed into the second graphical element by a manipulation of the fourth icon on the GUI;
    based on the third icon representing the third application having been placed into the second graphical element and the fourth icon not having been placed into the second graphical element, the mobile device obtaining one of the assigned second attributes, which specifies an interaction between the third and fourth applications, the interaction specifying information that is permitted to be exchanged between the third and fourth applications based on the third icon having been placed in the second graphical element and the fourth icon not having been placed in the second graphical element;
    if the access control settings of the third application are automatically configurable, the mobile device automatically configuring the access control settings of the third application based on the obtained attribute from the second attributes specifying the interaction between the third and fourth applications or if the access control settings of the third application are not automatically configurable, the mobile device applying the obtained attribute from the second attributes to the third application by utilizing resource controls of the operating system of the mobile device; and
    based on the mobile device automatically configuring the access control settings of the third application or the mobile device applying the obtained attribute from the second attributes to the third application by utilizing the resource controls of the operating system, the mobile device controlling an access of the fourth application by the third application.

17. The mobile device of claim 16, wherein the method further comprises the steps of:
    the mobile device assigning third attributes to a third graphical element included in the GUI of the mobile device;
    the mobile device detecting a manipulation of on the GUI of a fifth icon representing a fifth application installed on the mobile device, so that the fifth icon is moved towards and subsequently placed into the third graphical element included in the GUI;
    based on the fifth icon representing the fifth application having been placed into the third graphical element, the mobile device obtaining one of the assigned third attributes, which specifies a limitation of a consumption of a resource of the mobile device by the fifth application, the limitation being based on the fifth icon having been placed into the third graphical element, and the resource including a hardware device included in the mobile device, a virtual component of the mobile device, data managed by an application installed on the mobile device, or a physical or virtual component included in or data managed by a system external to the mobile device;

the mobile device determining whether access control settings of the fifth application are automatically configurable;

if the access control settings of the fifth application are automatically configurable, the mobile device automatically configuring the access control settings of the fifth application based on the obtained attribute from the third attributes or if the access control settings of the fifth application are not automatically configurable, the mobile device applying the obtained attribute from the third attributes to the fifth application by utilizing the resource controls of the operating system of the mobile device; and based on the mobile device automatically configuring the access control settings of the fifth application or the mobile device applying the obtained attribute from the third attributes to the fifth application by utilizing the resource controls of the operating system, the mobile device controlling an access of the resource by the fifth application.

18. The mobile device of claim 17, wherein the step of assigning the attributes to the graphical element includes assigning the attributes to a first folder in the GUI of the mobile device, wherein the step of assigning the second attributes to the second graphical element included in the GUI includes assigning the second attributes to a second folder in the GUI, wherein the step of assigning the third attributes to the third graphical element included in the GUI includes assigning the third attributes to a third folder in the GUI, wherein the step of detecting the manipulation of the first icon includes detecting a first drag and drop of the first icon into the first folder, wherein the step of detecting the manipulation of the second icon includes detecting a second drag and drop of second icon into the first folder, wherein the step of detecting the manipulation of the third icon includes detecting a third drag and drop of the third icon into the second folder, wherein the step of determining the fourth icon has not been placed into the second graphical element includes determining that a drag and drop of the fourth icon into the second folder has not occurred, wherein the step of detecting the manipulation of the fifth icon includes detecting a fourth drag and drop of the fifth icon into the third folder, wherein the step of obtaining one of the assigned attributes is based on the first and second icons having been dragged and dropped into the first folder, wherein the step of obtaining one of the assigned second attributes is based on the third icon having been dragged and dropped into the second folder and the fourth icon not having been dragged and dropped into the second folder, and wherein the step of obtaining one of the assigned third attributes is based on the fifth icon having been dragged and dropped into the third folder.

19. The mobile device of claim 17, wherein the step of controlling the access of the second application by the first application is based on the first and second icons having been dragged and dropped into the first folder, wherein the step of controlling the access of the fourth application by the third application is based on the third icon having been dragged and dropped into the second folder and the fourth icon not having been dragged and dropped into the second folder, wherein the step of controlling the access the access of the resource by the fifth application is based on the fifth icon having been dragged and dropped into the third folder.

20. The mobile device of claim 15, wherein the method further comprises the steps of:

the mobile device assigning first, second, and third attributes to first, second, and third folders, respectively, included in the GUI, the first attributes specifying first restrictions on an access by an application to other application(s), application data, or hardware of the mobile device if an icon of the application is in the first folder, the second attributes specifying second restrictions on the access by the application to the other application(s), application data, or hardware of the mobile device if the icon of the application is in the second folder, and the third attributes specifying third restrictions on the access by the application to the other application(s), application data, or hardware of the mobile device if the icon of the application is in the third folder, wherein the first restrictions are more restrictive than the second or third restrictions, and wherein the second restrictions are more restrictive than the third restrictions;

the mobile device detecting an initial installation of the application;

based on the detected initial installation, the mobile device placing the icon of the application into the second folder;

the mobile device monitoring a usage of the application over a predetermined period of time;

the mobile device determining whether the usage of the application during the predetermined period of time exceeds a first threshold and detecting whether a user of the mobile device is indicating that the application requires a decrease in restrictions on access to the other application(s), application data, or hardware of the mobile device;

if the usage exceeds the first threshold and the user indicates that the application requires the decrease in restrictions, the mobile device moves the icon of the application from the second folder to the third folder, which permits the application to have additional access to the other application(s), application data, or hardware of the mobile device, or if the usage does not exceed the first threshold or the user does not indicate that the application requires the decrease in restrictions, the mobile device determining whether the usage is less than a second threshold; and if the mobile device determines the usage is less than the second threshold, the mobile device moves the icon of the application from the second folder to the first folder, which restricts the application to have less access to the other application(s), application data, or hardware of the mobile device.

* * * * *